March 19, 1963 F. D. RUGG 3,082,021
FIFTH-WHEEL ASSEMBLY
Filed June 12, 1962 3 Sheets-Sheet 1
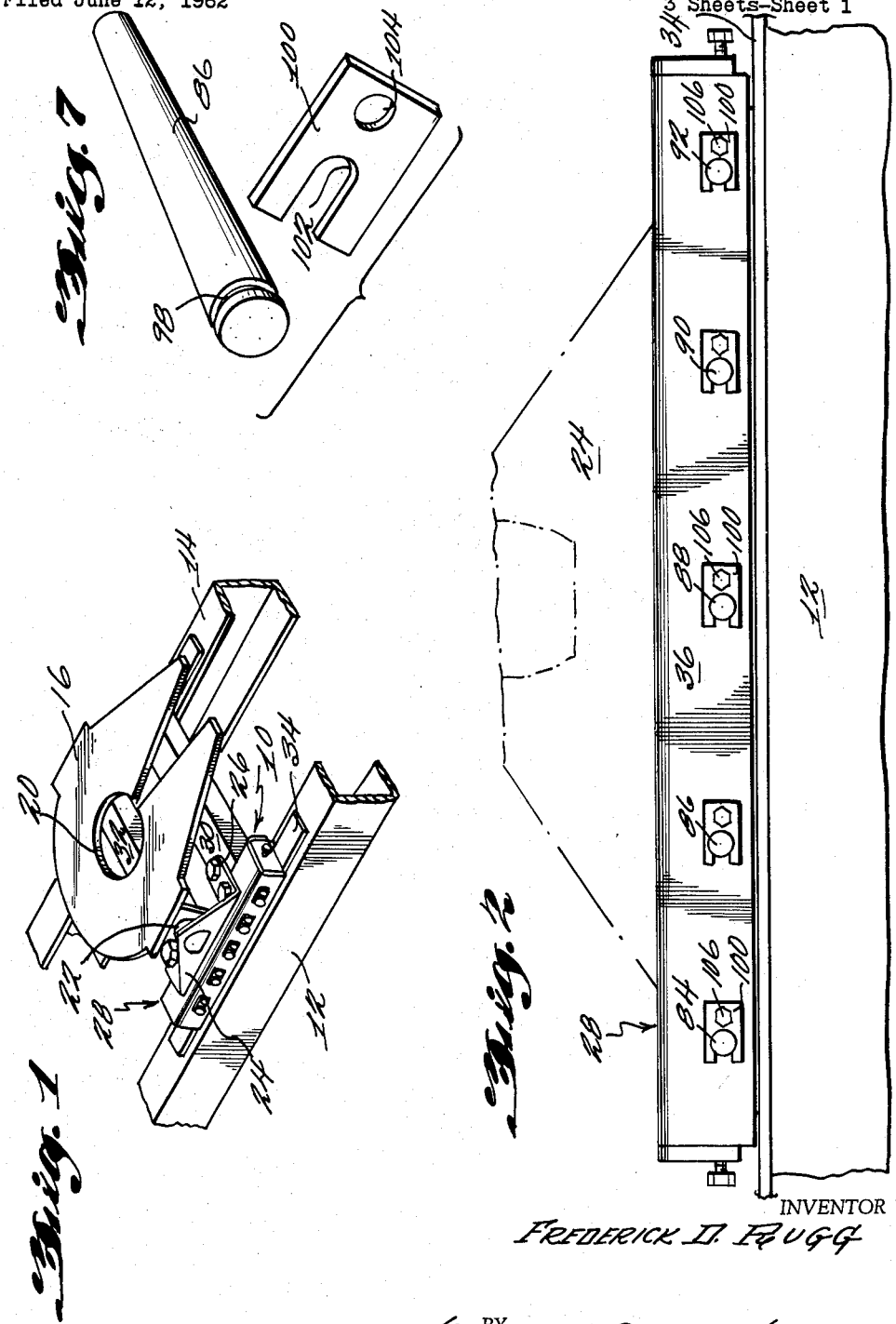
INVENTOR
FREDERICK D. RUGG
BY
Cushman, Darby & Cushman
ATTORNEYS

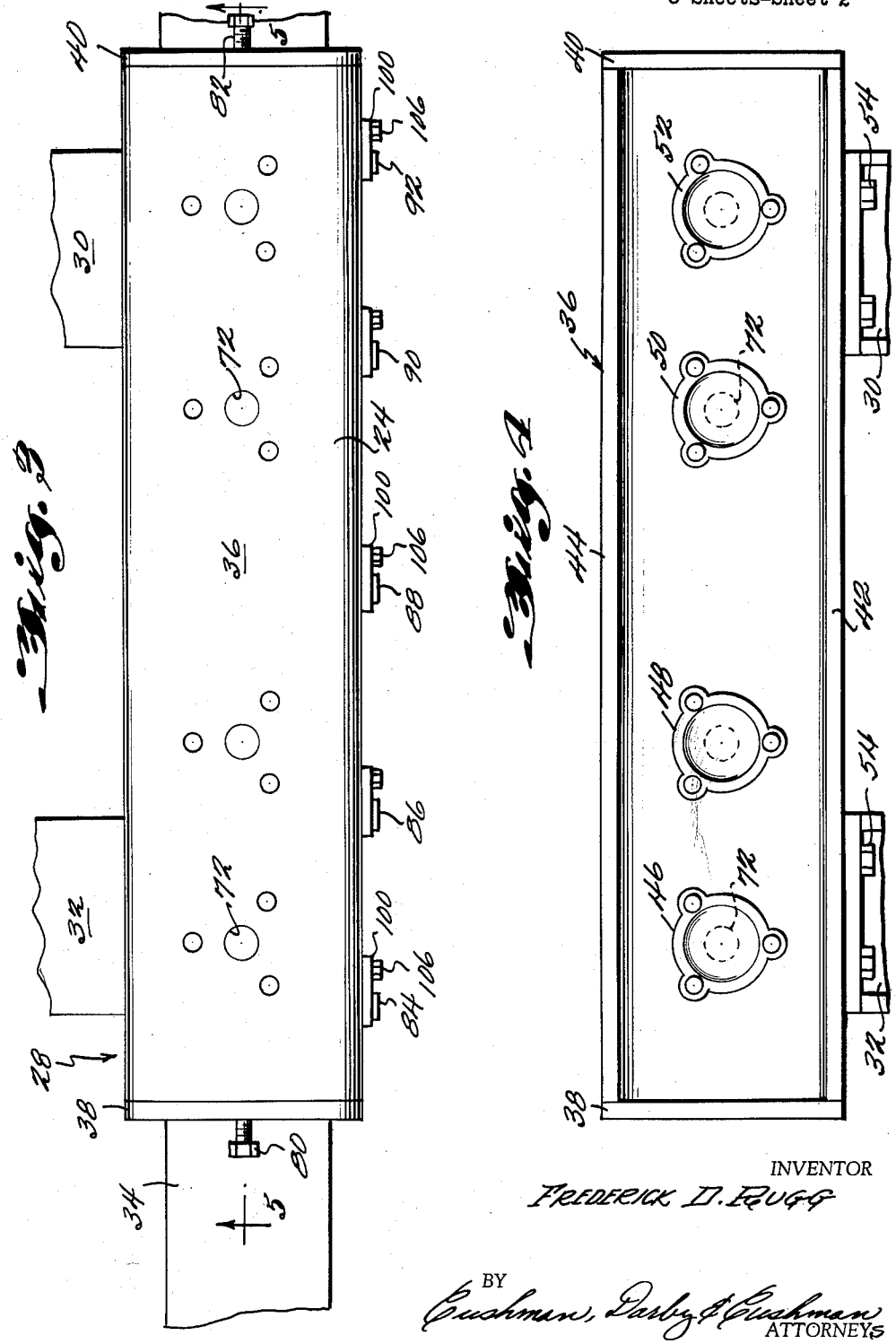

March 19, 1963  F. D. RUGG  3,082,021
FIFTH-WHEEL ASSEMBLY
Filed June 12, 1962  3 Sheets-Sheet 3
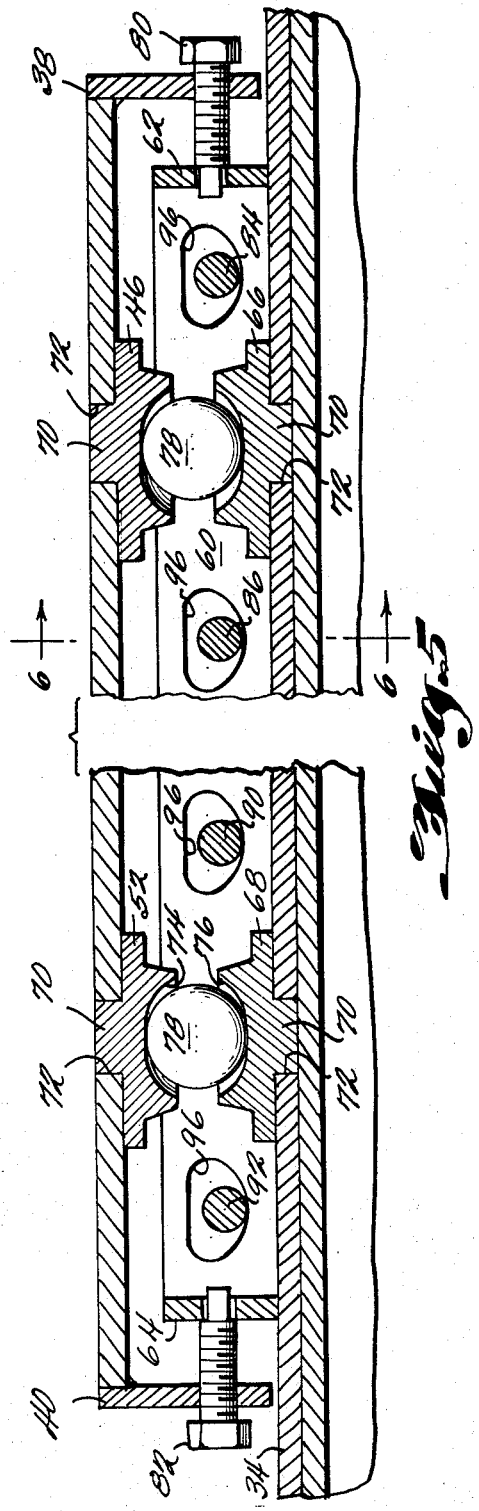
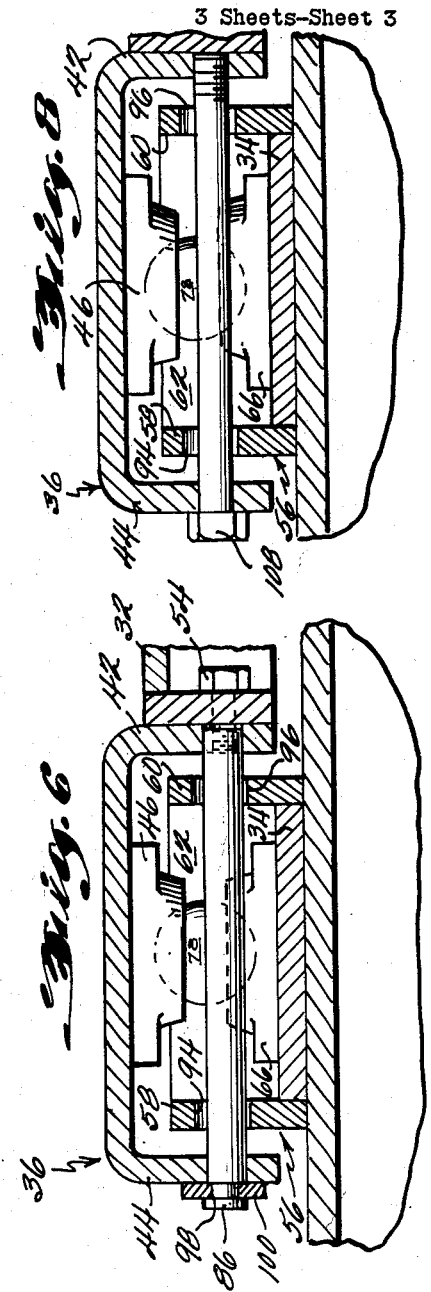
INVENTOR
FREDERICK D. RUGG
BY
Cushman, Darby & Cushman
ATTORNEYS United States Patent Office 3,082,021
Patented Mar. 19, 1963

3,082,021
FIFTH-WHEEL ASSEMBLY
Frederick D. Rugg, East Bridgewater, Mass., assignor to Inertia-Matic, Inc., Watertown, Mass., a corporation of Massachusetts
Filed June 12, 1962, Ser. No. 201,903
15 Claims. (Cl. 280—438)

The present invention relates to a fifth wheel assembly for use with freight carrying vehicles of the type commonly known as tractor-trailer.

This application is a continuation-in-part of my copending application, Serial No. 82,112, filed January 11, 1961 for Unit Mount and now abandoned, which in turn is a continuation-in-part of my copending application, Serial No. 22,064, filed April 13, 1960 for Fifth Wheel Assembly.

Tractor-trailer units employ a fifth wheel assembly for coupling trailer sections with tractor sections so that the trailer section is pivotally movable with respect to the tractor section.

In order to provide for some minor movements of portions of the fifth wheel assembly during coupling of the tractor with the trailer, and in order to reduce shock and vibration transferred between the separate sections of the tractor-trailer combination, various means have been suggested for use in coupling the fifth wheel assembly to the tractor and/or to the trailer.

Also in tractor and trailer combinations, certain forces are exerted by the trailer on the tractor which tend to slow the tractor during the operation thereof which results in excess fuel consumption and decreases the overall efficiency of the unit. The trailer also imposes a drag on the tractor which must be overcome.

The disclosure in my copending application, Serial No. 22,064, is directed to a fifth wheel assembly whereby undesirable forces and conditions which exist between a tractor vehicle and a trailer towed thereby may be overcome or at least lessened to a considerable extent. The fifth wheel assembly is supported on a frame mounted on a plurality of universal coupling units secured to the frame rails of the tractor vehicle. These units each include a pair of complementary bearing cups between which is disposed a ball member. The ball member is adapted to move over the surfaces of the bearing cups and allows universal movement of the fifth wheel, whereby the undesirable characteristics of the usual fifth wheel assemblies are obviated.

The fifth wheel assembly disclosed in the present invention and in my copending application, Serial No. 82,112, is an improvement over the assembly shown in my copending application, Serial No. 22,064, wherein the instant assembly is in the form of a substantially unitary structure and is easier to install on existing tractor vehicles.

The inherent disadvantages of prior art devices for fifth wheel assemblies are overcome by providing in the instant invention a novel fifth wheel assembly.

The primary object of the invention is a fifth wheel assembly which is universally movable with respect to the tractor vehicle with which it is attached.

Another object of the invention is a fifth wheel assembly which is in the form of a generally unitary structure.

Other objects and advantages will become readily apparent by referring to the following detailed description when taken with the accompanying drawings, wherein:

FIGURE 1 is a fragmentary perspective showing the fifth wheel and fifth wheel assembly secured to the frame rails of a tractor vehicle;

FIGURE 2 is a fragmentary side elevation of the assembly shown in FIGURE 1;

FIGURE 3 is a fragmentary top plan view of one of the structures forming part of the assembly;

FIGURE 4 is a bottom plan view of the upper member forming part of the structure of FIGURE 3.

FIGURE 5 is an enlarged fragmentary longitudinal section taken along line 5—5 of FIGURE 3;

FIGURE 6 is a vertical section taken along line 6—6 of FIGURE 5 showing the relationship of the upper and lower members, the bearing cups and bearing, and the manner in which the upper and lower members are engaged;

FIGURE 7 is an enlarged perspective of an engaging means for securing the upper and lower members of the assembly for limiting movement therebetween; and FIGURE 8 is a vertical section similar to FIGURE 6 showing a modified form of the engaging means.

Referring to the drawings, FIGURE 1 illustrates the fifth wheel assembly generally 10 of the present invention secured to frame rails 12 and 14 of a tractor vehicle not shown. The fifth wheel plate 16 is pivotally supported on the upper member assembly which forms part of assembly 10. It will be noted that the fifth wheel plate 16 is provided with a channel 18 extending into a king-pin receiving opening 20. The latching structure and similar devices associated with connecting the king-pin securely to the king-pin plate have been eliminated. Such devices form no part of the present invention and the elimination simplifies the overall consideration of the invention.

The fifth wheel plate 16 is pivotally supported above frame rails 12 and 14. As shown in FIGURE 1, the plate 16 has a pivot shaft 22 projecting from either side thereof. The pivot shafts cooperate with bearing blocks 24 which are supported on assembly 10 in any suitable manner such as by bolts 26.

The fifth wheel assembly comprises a substantially elongated structure 28 mounted on each of frame rails 12 and 14 and secured to cross members 30 and 32 by means to be described hereinafter. While the assembly comprises a pair of the elongated structures joined by the cross members, only one such structure is shown in the drawings and will be described in detail. It will be understood that the detailed description applies equally and fully to each of the elongated structures.

As shown in FIGURES 1 and 2, the elongated structure 28 is provided with hold-down bar 34 which is placed in intimate contact with frame rail 12 of the tractor vehicle and secured thereto in any suitable manner such as by welding, bolting or by use of U-bolt clamps. Elongated structure 28 is secured to hold-down bar 34 in a manner to be later described.

In FIGURE 3 is shown elongated structure 28 mounted on hold-down bar 34 and the relative position of bearing block 24, shown in phantom.

In FIGURE 4 there is shown upper member 36 forming part of elongated structure 28. Upper member 36 is a substantially box shaped structure having end walls 38 and 40 and side walls 42 and 44. Within the box shaped upper member 36 there are shown a plurality of bearing cups 46, 48, 50 and 52, each having curved face portions. The bearing cups 46, 48, 50 and 52 are secured within the box shaped upper member 36 at spaced points along the longitudinal center line thereof. As also shown in FIGURE 4, cross members 30 and 32 are secured to upper member 36 such as by bolts 54. As explained above, since the complete fifth wheel assembly 10 comprises a pair of elongated structures 28, there are therefore two upper members 36 which are secured together in spaced relation by cross members 30 and 32 secured by bolts 54 to opposed side wall portions of the upper members. The length of the cross members 30 and 32 is dependent on the vehicle with which the fifth wheel assembly is to be used and the distance between frame rails 12 and 14 upon which assembly 10 is mounted.

The elongated structure 28, and the component parts thereof, will be best understood by reference to FIGURES 5 and 6. Structure 28 comprises a substantially box shaped structure, lower member 56, and the substantially box shaped upper member 36 which has a greater dimension than lower member 56. Lower member 56 has as its base hold-down bar 34 to which are secured side walls 58 and 60 and end walls 62 and 64. As noted hereinbefore with regard to FIGURES 3 and 4, upper member 36 comprises end walls 38, 40 and side walls 42, 44 and has secured therein bearing cups 46, 48, 50 and 52. Disposed in lower member 56 are identical bearing cups. Two of these cups, 66 and 68, are shown in FIGURE 5. Preferably, each of the bearing cups carries a boss 70 extending from the base portion thereof. When the bosses pass through apertures 72 in upper member 36 and lower member 56, the bearing cups are centered longitudinally in the members as seen in FIGURES 3 and 4. Also, each of the aligned bearing cups is provided with opposed curved and complementary bearing face portions 74 and 76. Disposed between bearing face portions 74 and 76 is a ball member 78 cooperating with bearing faces and adapted to move thereover. The ball 78 is of less dimension than the area defined by the curved bearing faces 74 and 76 whereby there is some play of the ball 78. Thus the fifth wheel is universally movable with respect to the tractor.

When the upper member 36 is placed in overlaying relation to the lower member 56 secured to the frame rail of the vehicle, the bearing cups secured to the upper member and to the lower member are vertically aligned. Thus in FIGURE 5, bearing cups 46 and 66 are in vertical alignment as are cups 52 and 68. When considering fifth wheel assembly 10 as a whole, upper members 36 secured to cross members 30 and 32 are considered the upper member assembly which is centered with relation to each of the lower members 56 by means of centering bolts. Two of these bolts 80 and 82 are shown in FIGURE 5 threadably secured in end walls 38 and 40, respectively, of upper member 36 and engaging end walls 62 and 64, respectively, of lower member 56. The lower members 56 forming part of assembly 10 are secured to frame rails 12 and 14 and the upper members 36 of the upper member assembly are placed in superimposed relation to the lower members. When assembled, the lower members 56 are in generally telescoping relation to upper members 36.

The upper member assembly is fixed to each of the lower members for limited movement by securing elements. In the modification of the invention shown in FIGURES 1–7, the securing elements are restraining pins 84, 86, 88, 90 and 92 extending through apertures in wall portions 42 and 44 of upper member 36 and through the elongated openings 94 and 96 of side walls 58 and 60, respectively, of lower member 56. The restraining pins are spaced along the longitudinal dimension of elongated structure 28 and pass between the bearing cups in the upper and lower members. The relative movement between the upper and lower members is limited in extent by the size of the openings 94 and 96 in side walls 58 and 60 of the lower member.

As seen in FIGURE 7, showing one of the restraining pins 86, the pin comprises an elongated rod-like member having a circumferential groove 98 adjacent one end thereof. Also, provided is substantially U-shaped lock clip 100 having a socket portion 102 and aperture 104. Socket portion 102 has a base curvature substantially mating that of groove 98 of pin 86.

By referring to FIGURES 2 and 6, it will be noted that pin 86 passes through elongated openings 94 and 96 in side walls 58 and 60 of lower member 56 and is secured to side walls 42 and 44 of upper member 36.

As seen, the thickness of lock clip 100 is such as to enable socket portion 102 thereof to engage in groove 98 of pin 86. Lock clip 100 is secured to side wall 44 by bolt 106 which passes through aperture 104 of clip 100 and is threadably secured in side wall 44. The length and dimension of pin 86 are such that the end which is secured to side wall 42 is in frictional engagement with and substantially passes through an aperture in wall 42. While the above discussion has related to restraining pin 86, it is to be understood that each of the remaining pins 84, 88, 90 and 92 are identical and similarly engage the upper and lower members of elongated structure 28.

In FIGURE 8 there is shown a modified form of the securing element. Bolt 108 passes through the aperture in side wall 44, through elongated openings 94 and 96 and is threadably secured in side wall 42. As with the restraining pins, bolts 108 are spaced along the longitudinal dimension of elongated structure 28 and pass between the bearing cups in the upper and lower members.

When the upper members are positioned in their proper relation to the lower members which have been secured to the tractor vehicle frame, there is sufficient play to allow relative movement between the upper and lower members. When a trailer vehicle is attached to the fifth wheel mounted on the upper members 36 of fifth wheel assembly 10 and the tractor vehicle started, the inertia of rest has to be overcome. With the fifth wheel assembly as described herein, used on the vehicle, the tractor vehicle begins to move first, moving the lower members out from under the load a distance equal to the free travel of the ball in the bearing cups. This movement tends to start the balls up the curved surfaces of the rear of the lower bearing cups and the front curved surfaces of the upper bearing cups. At the point where gravity forces the ball down the curved surfaces of the bearing cups, the stored energy is returned to the system creating a smooth acceleration. In deceleration, the opposite action is true and the tendency of the body and load is in the reverse direction tending to aid in the slowing down and stopping of the vehicle.

As stated, the novel fifth wheel assembly described herein is universal whereby the assembly can move horizontally and vertically under the forces of the tractor bearing thereon. The provisions of such mounting means greatly enhances the character of the tractor-trailer combination with which such units are used. The improved characteristic obtained through the use of the novel fifth wheel assembly in combination with a tractor-trailer in accordance with this invention will be apparent from the use of Table I below.

*Table I*

| Items | Resultant Savings [1] |
|---|---|
| 1. Built-in safety device for driver and motoring public and equipment: | |
| (a) In emergency stopping force goes into vertical plane protecting driver, cargo and equipment | C E G |
| (b) Reduces possibility of jack-knife of tractor-trailer combination | C E F G |
| 2. Ease of acceleration: By moving tractor first—then load | A B D G |
| 3. Ease of deceleration: By changing rate of deceleration between trailer and tractor | B C F G |
| 4. Greater controllability: In steering and cornering trailer leans into the plane of acceleration giving driver much greater control | B C E |
| 5. Braking: Improved braking results in stopping within a shorter distance | B C F |
| 6. Vibration, impact and road shock: Substantially reduced by creation of flexible joint between load and tractor | B C E G |
| 7. Liquid surge: Surge effects, common to tank operations, reduced by changing longitudinal force to vertical | B C E F |
| 8. Full engine power on grades: Given loads on given grades have shown minimum gear requirement to be one full gear higher than normal | A C D |

[1] A—Less fuel consumption; B—Less tire wear; C—Greater driver safety and comfort; D—Less engine and drive-line assembly strain; E—Longer chassis and trailer life; F—Longer brake life; G—Protection of cargo.

The invention has been described herein in its preferred embodiment, however, various changes and modifications thereof may be made and considered to be within the spirit and scope of the appended claims.

What is claimed is:

1. A fifth wheel assembly for use with a tractor-trailer vehicle, said tractor including a frame, a lower member on the frame portion of said tractor, a plurality of bearing cups secured to said lower member and having curved face portions, an upper member having a fifth wheel mounted thereon, operatively secured to said lower member, a plurality of bearing cups secured to said upper member and having curved face portions, said curved face portions of said bearing cups secured to said lower member being complementary to the curved face portions of said bearing cups secured to said upper member, a ball member disposed between said complementary curved face portions and movable thereover whereby said fifth wheel is universally movable.

2. A fifth wheel assembly as defined in claim 1 wherein said lower member includes wall portions defining a substantially box shaped structure.

3. A fifth wheel assembly as defined in claim 2 wherein said bearing cups secured to said lower member are contained within said box shaped structure.

4. A fifth wheel assembly as defined in claim 1 wherein said upper member includes wall portions defining a substantially box shaped structure.

5. A fifth wheel assembly as defined in claim 4 wherein said bearing cups secured to said upper member are contained within said box shaped structure.

6. A fifth wheel assembly as defined in claim 2 wherein said upper member includes wall portions defining a box shaped structure of greater dimension than the box shaped structure defined by the said wall portions of said lower member.

7. A fifth wheel assembly as defined in claim 6 wherein said upper box shaped structure and said lower box shaped structure are in telescoping relation.

8. A fifth wheel assembly as defined in claim 7 including means whereby said upper box shaped structure operatively engages said lower box shaped structure for limited relative movement with respect thereto.

9. A fifth wheel assembly as defined in claim 8 wherein said engaging means includes a pin extending through apertures in opposed wall portions of said lower box shaped structure and secured to corresponding opposed wall portions of said upper box shaped structure.

10. A fifth wheel assembly as defined in claim 8 wherein said engaging means includes a bolt passing through and threadably secured to opposed wall portions of said upper box shaped structure and passing through apertures in corresponding opposed wall portions of said lower box shaped structure.

11. A fifth wheel assembly for use with a tractor-trailer vehicle, said tractor including a frame, a pair of box shaped lower members secured to the frame portion of said tractor, bearing cups secured to each of said lower members, said bearing cups being spaced along the longitudinal center lines of said lower members, upper box shaped members having a fifth wheel mounted thereon operatively secured in telescoping relation to said lower members, bearing cups secured to said upper members and spaced along the longitudinal center lines thereof, said bearing cups secured to said lower members being complementary to said bearing cups secured to said upper members, a ball member between said bearing cups and movable with respect thereto whereby said fifth wheel is universally movable.

12. A fifth wheel assembly as defined in claim 11 wherein said upper members further include centering means.

13. A fifth wheel assembly as defined in claim 12 wherein said centering means includes bolts threadably secured to said upper members.

14. A fifth wheel assembly as defined in claim 11 wherein said upper members are secured together in spaced relation.

15. A fifth wheel assembly as defined in claim 11 wherein said upper members operatively engage said lower members for limited relative movement with respect thereto.

References Cited in the file of this patent
UNITED STATES PATENTS

| | | |
|---|---|---|
| 2,355,528 | Harper | Aug. 8, 1944 |
| 2,867,472 | Harper | Jan. 6, 1959 |
| 2,958,542 | Janeway | Nov. 1, 1960 |